United States Patent Office

3,021,373
Patented Feb. 13, 1962

3,021,373
PREPARATION OF 1-ALKENYL, ALKENYL ETHERS
Amelio E. Montagna and Donald H. Hirsh, South Charleston, W. Va., assignors to Union Carbide Corporation, a corporation of New York
No Drawing. Filed Jan. 11, 1956, Ser. No. 558,425
13 Claims. (Cl. 260—614)

This invention relates to the preparation of 1-alkenyl alkenyl ethers. In particular it relates to the preparation of 1-alkenyl, alkenyl ethers of the formula

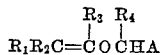

wherein $R_1$, $R_2$, and $R_3$ are selected from the group consisting of H and alkyl radicals of from 1 to 8 carbon atoms; $R_4$ is selected from the group consisting of H and alkyl radicals of from 1 to 4 carbon atoms; and $R_1$, $R_2$, $R_3$, and $R_4$ taken collectively contain at most 12 carbon atoms; and wherein A is an alkenyl radical of from 2 to 11 carbon atoms, by the liquid phase de-alcoholation of the corresponding acetals and ketals having the formula

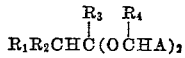

The group of acetals and ketals of the above formula wherein A is further defined as being a 1-alkenyl radical is eminetly well suited for the production of ethers according to the method of our invention, and the production of such ethers represents a preferred embodiment of our invention.

The ethers which may be made by our method are valuable and reactive compounds. They may be polymerized to form useful solids. They are useful intermediates in syntheses and provide new routes to valuable materials. An illustration of such use is found in vinyl allyl ether which may be isomerized to form 4-pentenal which can be further reacted by way of its carbonyl group and unsaturated carbon carbon linkage; 4-pentenal can be hydroformylated and then hydrogenated to a diol or oxidized to a dibasic acid; it can be reduced and/or oxidized to pentanal, pentanol, pentanoic acid, and 4-pentenoic acid.

The many possible reactions of the ethers prepared by our method make their production, in good yield, particularly difficult and heretofore this valuable group of compounds has been largely unavailable to the chemical arts. We have now discovered that these ethers may be prepared in good yield and efficiency, and in an economical fashion.

In our method for producing a 1-alkenyl alkenyl ether the corresponding acetal or ketal is heated to a temperature sufficient to vaporize the ether and alcohol produced, preferably to a temperature near the boiling point of the acetal or ketal under the reaction pressure. After the compound being heated has attained the desired temperature, a strong acid catalyst in the form of a solution, preferably a solution of the acid in the compound being decomposed, i.e., the acetal or ketal being decomposed, is introduced into the previously heated acetal or ketal. Under the influence of the acid catalyst the compound heated is de-alcoholated and the desired 1-alkenyl alkenyl ether is produced in the heated reaction mixture, and, once produced, is vaporized. The vapors are recovered substantially at the rate at which they are produced in the reaction vessel. The de-alcoholation reaction may be illustrated by the chemical equation

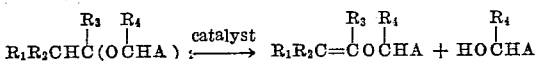

which illustrates the production of the 1-alkenyl alkenyl ether and the alcohol co-product.

More specifically speaking, our preferred method for making a 1-alkenyl alkenyl ether of the formula

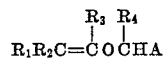

wherein, $R_1$, $R_2$ and $R_3$ are selected from the group consisting of H and alkyl radicals of from 1 to 8 carbon atoms; $R_4$ is selected from the group consisting of H and alkyl radicals of from 1 to 4 carbon atoms; $R_1$, $R_2$, $R_3$ and $R_4$ taken collectively contain at most 12 carbon atoms; and A is an alkenyl radical containing from 2 to 11 carbon atoms, comprises heating the corresponding compound of the formula

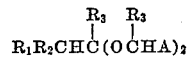

in the liquid phase in a reaction vessel to a temperature of from 75 to 225° C., while under a pressure of from 0.1 mm. of Hg to 100 p.s.i.g., said temperature and pressure being sufficient to vaporize the ether and the alcohol of the formula

and said temperature preferably being near the boiling point of the compound (acetal or ketal) at the reaction pressure; thereafter introducing a strong acid or acid reacting substance which is substantially non-volatile under the reaction conditions into the reaction vessel and causing the de-alcoholation of said compound to form said 1-alkenyl alkenyl ether and said alcohol co-product, said catalyst being introduced in an amount to give a catalyst concentration in the reaction mixture of from 0.005 to 5.0 percent by weight of the reaction mixture, and said catalyst being introduced as a solution in a solvent selected from the class consisting of the compound heated, the alcohol co-product, and inert diluents for the reaction; partially rectifying the vapors so produced; and recovering said vapors.

The vapors are preferably recovered by condensing them and collecting the condensate in a suitable receiver. It is also advantageous to collect the condensate under alkaline conditions. Furthermore increased yields are obtained if the ether produced is removed from the reaction vessel substantially at the rate at which it is produced.

When a solid catalyst such as activated clay is employed the catalyst may be added to the acetal or ketal and the mixture later heated to the reaction temperature. Our method is preferably operated as a continuous process although a batch process is satisfactory. Under continuous operation fresh acetal or ketal is added to replenish that decomposed, and more catalyst is added if needed to maintain the rate of production of the ether.

Using our method we have made vinyl allyl ether from diallyl acetal, 1-butenyl allyl ether from diallyl butyral, isopropenyl allyl ether from diallyl ketal, and vinyl 2-methyl-2-pentenyl ether from di(2-methyl-2-pentenyl) acetal; forming 1-alkenyl, 2-alkenyl ethers such as these represents a preferred embodiment of our invention. Other 1-alkenyl alkenyl ethers which may be made by our method by decomposition of acetals or ketals are those where the 1-alkenyl group may be vinyl, 1-propenyl, 1-butenyl, 1-pentenyl, 2-methyl-1-pentenyl, 2-ethyl-1-butenyl, 1-hexenyl, 2-ethyl-1-hexenyl, 1-octenyl, 1-decenyl, 2-ethyl-1-octenyl, 2-butyl-1-octenyl, isopropenyl, 1-methyl-1-propenyl, 1-ethylvinyl, 1-ethyl-1-propenyl, 1-propyl-1-butenyl, and the like, and where the other alkenyl group may be allyl, crotyl, methallyl, 3-butenyl, 4-pentenyl, 2-hexenyl, 2-methyl-2-pentenyl, 2-ethyl-2-butenyl, 2-octenyl, 2-ethyl-2-hexenyl, 2-butyl-2-octenyl, 1-methyl-2-propenyl, 1,3-dimethyl-2-butenyl, 1-methyl-2-butenyl, 1-methyl-2-hexenyl, 1-methyl-4-ethyl-2-octenyl, and the like.

A suitable apparatus is a reaction vessel attached to a fractionating distillation column, condenser and receiver. The column should be of such capacity as to rectify and remove the vapors produced in de-alcoholating the acetal or ketal at about the rate at which they are produced. It is less desirable to remove the vapors from the reaction vessel without rectification inasmuch as this results in some of the acetal or ketal being removed with the ether and alcohol produced, and hence in lowered yields per pass of the acetal or ketal. Operation without rectification results in the same chemical efficiency but entails recovering and recycling large amounts of the acetal or ketal, whereas with suitable rectification it is possible to obtain essentially quantitative conversion of the acetal or ketal in a single pass. On the other hand it is undesirable to operate in such a manner that the ether is returned to the reactor for this results in lowered yields due to polymerization of the ether upon prolonged contact with the catalyst. Optimum operating conditions appear to be attained when partial rectification of the products is employed. It is important that the 1-alkenyl alkenyl ether be removed from the reaction vessel substantially at the rate at which it is formed inasmuch as prolonged contact with the catalytic medium induces polymerization and results in lowered yields.

A diluent for the reaction is not prerequisite to the succesful operation of our method; on the other hand, an inert diluent may be employed if desired.

The catalysts suitable for the decomposition reaction are the strong acids which are substantially non-volatile at the reaction temperature and pressure. Phosphoric, sulfuric, and p-toluenesulfonic acid are all suitable catalysts and may be employed in a concentration of 0.005 to 5.0 percent by weight of the reaction mixture. Activated clays, such as Super-Filtrol X-202, and acid reacting salts, such as zinc chloride, also are suitable catalysts and may be employed in amounts ranging from 0.1 to 10% by weight of the reaction mixture. In the usual case the catalyst concentration will be determined by the rate of de-alcoholation desired. Phosphoric acid is the preferred catalyst, and is preferably used in a concentration of about 0.01 to 1.0 percent by weight of the reaction mixture.

The catalyst is added as a solution in a solvent selected from the class consisting of the compound being decomposed (the acetal or ketal employed as the starting material), the alcohol co-product of the reaction, and inert diluents for the reaction. It is preferred that the catalyst be added as a dilute solution, said solution being composed of catalyst and the acetal or ketal being de-alcoholated. However, the catalyst may be added as a solution in the alcohol co-product or in an inert diluent. The solution of the catalyst preferably is added after the acetal or ketal has been heated to the temperature at which the reaction is to be conducted. If a continuous process is employed, fresh catalyst, also as a solution in the acetal or ketal, or in the co-product alcohol, or in an inert diluent, may be added to maintain the reaction rate, if necessary or desired.

In the case of the higher-boiling ethers our method may advantageously be employed under reduced pressures, and in the case of the lower-boiling ethers superatmospheric pressure may be used. A pressure range of from 0.1 mm. Hg to 100 p.s.i.g. is a suitable range of pressures; the range of from 1 mm. Hg to 760 mm. Hg is preferred. Along with these pressures the temperature range of from 75 to 225° C. may be used; the range from 100 to 175° C. is preferred.

In order to repress undesired reactions of the products, the products should be collected under alkaline conditions. A variety of materials is suitable for producing the desired alkalinity and includes inorganic bases such as sodium carbonate and hydroxide, alcoholates such as sodium alcoholates, and amines such as di(2-ethylhexyl) amine.

The following examples are illustrative.

Example I

Two hundred grams of diallyl acetal of a purity of 98.8 percent was charged to a 500 ml. glass kettle equipped with a thermowell, inlets for catalyst and acetal feeds, and heating mantle. The reaction kettle was attached to a 25 by 1160 mm. glass still column having three thermowells inserted at the following points: (1) at a point from the top equal to one-third the over-all length of the column (about 387 mm.); (2) at a point of equal distance (about 387 mm.) from the bottom; and (3) at a point equi-distant from top and bottom (about 580 mm. from either end). The column was packed with stainless-steel sponge and was wrapped with magnesia insulation.

The charge of diallyl acetal was heated to boiling. When the hot acetal vapors reached the bottom thermowell, 0.118 gram of 85 percent ortho-phosphoric acid dissolved in 10 ml. of diallyl acetal (0.05 percent orthophosphoric acid based on the kettle charge) was added to the kettle and the diallyl acetal feed was started. The diallyl acetal was fed to the still kettle via a pump to maintain a constant liquid volume in the kettle. Distillate was removed at a rate sufficient to maintain a temperature of 100° C. at the top thermowell. The temperatures in the system, starting at the head, then coming down through the column, and finally in the kettle were as follows in the proper order: 82 to 84° C., 100° C., 135° C., 137° C., and 145 to 147° C., respectively.

The distillate receiver was equipped with a motor-driven stirrer and with a small buret. Di(2-ethylhexyl) amine was added to the receiver through the buret in an amount equal to about 0.1 percent of the distillate.

The rate of de-alcoholation decreased during the continuous operation and additional catalyst solution was added when necessary to restore the original rate. A total of 0.54 gram of 85 percent phosphoric acid dissolved in 46 ml. of diallyl acetal was added. This was equivalent to 0.23 percent of the kettle contents. The total input of 98.8 percent diallyl acetal was 2397 grams including the original charge to the kettle. The duration of the continuous operation was 12.4 hours.

The experiment was discontinued by shutting off the feed pump and neutralizing the catalyst with 15 ml. of a 5 percent solution of sodium hydroxide in allyl alcohol. Distillation was then continued and all of the remaining liquid was stripped from the kettle leaving 19 grams of residue. The total distillate was about 2300 grams.

The distillate (2291 gram aliquot) was charged to a still and rectified to obtain a 1227-gram fraction containing 93.7 percent vinyl allyl ether and approximately 6 percent allyl alcohol, representing a yield of 82 percent of vinyl allyl ether. The remaining fractions contained the bulk of the co-product allyl alcohol and a total of 255 grams of diallyl acetal giving an efficiency of 92 percent to vinyl allyl ether.

Refined vinyl allyl ether (98.8 percent) was obtained by washing the above-mentioned vinyl allyl ether fraction (93.7 percent) with water to remove the allyl alcohol. To prevent hydrolysis of the ether, the water was made slightly alkaline with sodium hydroxide. The refined product, vinyl allyl ether, thus obtained had the following physical properties: B.P.=66.5° C. (atm.); sp. gr. at 20/15.6° C.=0.803; refractive index, $n_D^{20}$=1.4108.

Example II

Diallyl acetal (1095 grams) and concentrated sulfuric acid (0.55 gram) were added to a 2-liter kettle to which was attached a 32 by 750 mm. glass column packed with stainless-steel sponge. The mixture was heated to boiling and the distillate was removed at a vapor temperature of 84 to 95° C. As the distillation progressed, the concentration of the acid in the kettle increased, causing low efficiency. The yield of vinyl allyl ether was 51 percent and the efficiency was 58 percent.

*Example III*

Operating in a manner similar to Example I, diallyl acetal was decomposed to vinyl allyl ether using 0.2 percent p-toluenesulfonic acid catalyst. The yield of vinyl allyl ether was 74.9 percent and the efficiency was 90.7 percent.

*Example IV*

Two percent powdered Super Filtrol X-202 catalyst, an activated clay, was added to the kettle before heating the charge of diallyl acetal. Then, the mixture was heated to boiling and the still operated in a manner similar to that of Example I, but without the addition of an alkali at the end of the cracking operation. The yield of vinyl allyl ether was 52.8 percent at an efficiency of 61.4 percent.

*Example V*

Diallyl butyral was de-alcoholated using phosphoric acid catalyst and in a manner similar to that of Example I to give 1-butenyl allyl ether having the following physical properties: B.P.=61° C. (100 mm.); refractive index, $n_D^{20}$=1.4280; sp. gr. 20/15.6=0.807, and molecular refractivity, observed=35.67; calculated=35.24. The yield of 1-butenyl allyl ether was 61.3 percent.

*Example VI*

Isopropenyl allyl ether was prepared by liquid phase de-alcoholation of diallyl ketal, using phosphoric acid catalyst, in a manner similar to Example I. The following physical properties of isopropenyl allyl ether were determined: B.P.=88.5 (atm.); sp. gr. 20/15.6=0.809; refractive index $n_D^{20}$=1.4190; M.R., observed=30.63, calculated=30.62. The yield of isopropenyl allyl ether was 41.7 percent and the efficiency was 85.1 percent.

*Example VII*

Vinyl 2-methyl-2-pentenyl ether was prepared by the liquid-phase de-alcoholation of di(2-methyl-2-pentenyl) acetal at 50 mm. of mercury pressure in the presence of phosphoric acid catalyst. The de-alcoholation was achieved in a manner similar to that in Example I. The yield of vinyl 2-methyl-2-pentenyl ether was 90.3 percent. Physical constants for this product were as follows: B.P.=65° C. at 50 mm. Hg; refractive index, $n_D^{20}$=1.4372; specific gravity at 20/15.6° C.=0.821; molecular refractivity, observed=40.30; calculated=39.85.

What is claimed is:

1. The method of making a 1-alkenyl alkenyl ether of the formula

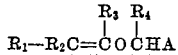

wherein $R_1$, $R_2$ and $R_3$ are selected from the group consisting of H and alkyl radicals of from 1 to 8 carbon atoms; $R_4$ is selected from the group consisting of H and alkyl radicals of from 1 to 4 carbon atoms; and $R_1$, $R_2$, $R_3$ and $R_4$ taken collectively contain at most 12 carbon atoms; and A is an alkenyl radical containing from 2 to 11 carbon atoms, which comprises heating the corresponding compound of the formula

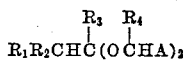

in the liquid phase in a reaction vessel to a temperature sufficient to vaporize the ether and the alcohol of the formula

thereafter introducing a strong acid catalyst which is substantially non-volatile under the reaction conditions into the reaction vessel, and causing the de-alcoholation of said compound to form said 1-alkenyl alkenyl ether and said alcohol co-product, said catalyst being introduced as a solution in a solvent inert with respect to reaction with the acetal, inert with respect to the alcohol co-product, and inert with respect to the ether save for reaction to form said acetal; partially rectifying the vapors so produced, to separate the compound heated from the ether and alcohol formed from said compound; and recovering said vapors.

2. The method of making a 1-alkenyl alkenyl ether of the formula

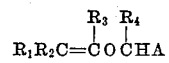

wherein $R_1$, $R_2$ and $R_3$ are selected from the group consisting of H and alkyl radicals of from 1 to 8 carbon atoms; $R_4$ is selected from the group consisting of H and alkyl radicals of from 1 to 4 carbon atoms; and $R_1$, $R_2$, $R_3$ and $R_4$ taken collectively contain at most 12 carbon atoms; and A is an alkenyl radical containing from 2 to 11 carbon atoms, which comprises heating the corresponding compound of the formula

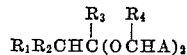

in the liquid phase in a reaction vessel to a temperature near the boiling point, under the reaction pressure, of the compound being decomposed; thereafter introducing a strong acid catalyst which is substantially non-volatile under the reaction conditions into the reaction vessel, and causing the de-alcoholation of said compound to form said 1-alkenyl alkenyl ether and an alcohol co-product of the formula

said catalyst being introduced as a solution in a solvent inert with respect to reaction with the acetal, inert with respect to the alcohol co-product, and inert with respect to the ether save for reaction to form said acetal; partially rectifying the vapors so produced to separate the compound heated from the ether and alcohol formed from the ether and alcohol formed from said compound; and recovering said vapors.

3. The method of making a 1-alkenyl alkenyl ether of the formula

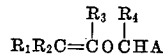

wherein $R_1$, $R_2$ and $R_3$ are selected from the group consisting of H and alkyl radicals of from 1 to 8 carbon atoms; $R_4$ is selected from the group consisting of H and alkyl radicals of from 1 to 4 carbon atoms; $R_1$, $R_2$, $R_3$ and $R_4$ taken collectively contain at most 12 carbon atoms; and A is an alkenyl radical containing from 2 to 11 carbon atoms, which comprises heating the corresponding compound of the formula

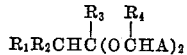

in the liquid phase in a reaction vessel to a temperature of from 75° C. to 225° C. while under a pressure of from 0.1 mm. Hg to about 6000 mm. Hg, said temperature being near the boiling point under the reaction pressure of the compound being heated, thereafter introducing a strong acid catalyst which is substantially non-volatile under the reaction conditions into the reaction vessel, and causing the de-alcoholation of said compound to form said 1-alkenyl alkenyl ether and an alcohol co-product of the formula

said catalyst being introduced as a solution in a solvent inert with respect to reaction with the acetal, inert with respect to the alcohol co-product, and inert with respect to the ether save for reaction to form said acetal, and in an amount sufficient to give a catalyst concentration in the reaction medium of from 0.005 to 5 percent by weight of the reaction mixture; partially rectifying the vapors so produced to separate the unreacted compound heated from the ether and alcohol formed from said compound; and recovering said vapors.

4. The method of making a 1-alkenyl alkenyl ether of the formula

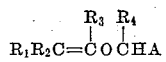

wherein $R_1$, $R_2$ and $R_3$ are selected from the group consisting of H and alkyl radicals of from 1 to 8 carbon atoms; $R_4$ is selected from the group consisting of H and alkyl radicals of from 1 to 4 carbon atoms; $R_1$, $R_2$, $R_3$ and $R_4$ taken collectively contain at most 12 carbon atoms; and A is a 1-alkenyl radical containing from 2 to 11 carbon atoms, which comprises heating the corresponding compound of the formula

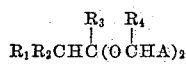

in the liquid phase in a reaction vesel to a temperature of from 75° C. to 225° C. while under a pressure of from 0.1 mm. Hg to about 6000 mm. Hg, said temperature being near the boiling point under the reaction pressure of the compound being heated; thereafter introducing a strong acid catalyst which is substantially non-volatile under the reaction conditions into the reaction vessel, and causing the de-alcoholation of said compound to form said 1-alkenyl alkenyl ether and an alcohol co-product of the formula

said catalyst being introduced as a solution in a solvent inert with respect to reaction with the acetal, inert with respect to the alcohol co-product, and inert with respect to the ether save for reaction to form said acetal, and in an amount sufficient to give a catalyst concentration in the reaction medium of from 0.005 to 5 percent by weight of the reaction mixture; partially rectifying the vapors so produced to separate the unreacted compound heated from the ether and alcohol formed from said compound; and recovering said vapors.

5. The method of making a 1-alkenyl alkenyl ether of the formula

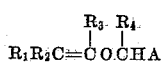

wherein $R_1$, $R_2$, and $R_3$ are selected from the group consisting of H and alkyl radicals of from 1 to 8 carbon atoms; $R_4$ is selected from the group consisting of H and alkyl radicals of from 1 to 4 carbon atoms; $R_1$, $R_2$, $R_3$ and $R_4$ taken collectively contain at most 12 carbon atoms; and A is a 1-alkenyl radical containing from 2 to 11 carbon atoms, which comprises heating the corresponding compound of the formula

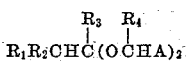

in the liquid phase in a reaction vessel to a temperature of from 100° C. to 175° C. while under a pressure of from 1 mm. Hg to 760 mm. of Hg, said temperature being near the boiling point under the reaction pressure of the compound being heated; thereafter introducing a strong acid catalyst which is substantially non-volatile under the reaction conditions into the reaction vessel, and causing the de-alcoholation of said compound to form said 1-alkenyl alkenyl ether and an alcohol co-product of the formula

said catalyst being introduced as a solution in a solvent inert with respect to reaction with the acetal, inert with respect to the alcohol co-product, and inert with respect to the ether save for reaction to form said acetal, and in an amount sufficient to give a catalyst concentration in the reaction medium of from 0.005 to 5 percent by weight of the reaction mixture; partially rectifying the vapors so produced to separate the unreacted compound heated from the ether and alcohol formed from said compound; and recovering said vapors.

6. The process of claim 3 further defined in that the strong acid catalyst is phosphoric acid.

7. The method of making a 1-alkenyl alkenyl ether of the formula

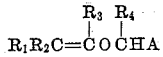

wherein $R_1$, $R_2$ and $R_3$ are selected from the group consisting of H and alkyl radicals of from 1 to 8 carbon atoms; $R_4$ is selected from the group consisting of H and alkyl radicals of from 1 to 4 carbon atoms; and A is a 1-alkenyl radical containing from 2 to 11 carbon atoms which comprises heating the corresponding compound of the formula

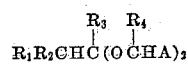

in the liquid phase in a reaction vessel to a temperature of from 75 to 225° C. while under a pressure of from 0.1 mm. of Hg to about 6000 mm. Hg, said temperature and pressure being near the boiling point under the reaction pressure of the compound being heated; thereafter introducing phosphoric acid catalyst into the reaction vessel and causing the de-alcoholation of said compound to form said 1-alkenyl alkenyl ether and an alcohol co-product of the formula

said catalyst being introduced as a solution in a solvent inert with respect to reaction with the acetal, inert with respect to the alcohol co-product, and inert with respect to the ether save for reaction to form said acetal, and in an amount sufficient to give a catalyst concentration in the reaction medium of from 0.01 to 1.0 percent by weight of the reaction mixture; partially rectifying the vapors so produced to separate the compound heated from the ether and alcohol formed from said compound; and recovering said vapors.

8. The process of claim 7 further defined in that the compound heated is diallyl acetal and the ether formed is vinyl allyl ether.

9. The process of claim 7 further defined in that the compound heated is diallyl ketal and the ether formed is isopropenyl allyl ether.

10. The process of claim 7 further defined in that the compound heated is diallyl butyral and the ether formed is 1-butenyl allyl ether.

11. The process of claim 7 further defined in that the compound heated is di(2-methyl-2-pentenyl) acetal and the ether formed is vinyl 2-methyl-2-pentenyl ether.

12. The method of making a 1-alkenyl alkenyl ether of the formula

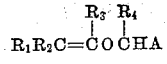

wherein $R_1$, $R_2$ and $R_3$ are selected from the group consisting of H and alkyl radicals of from 1 to 8 carbon atoms; $R_4$ is selected from the group consisting of H and alkyl radicals of from 1 to 4 carbon atoms; and $R_1$, $R_2$, $R_3$ and $R_4$ taken collectively contain at most 12 carbon atoms; and A is an alkenyl radical containing from 2 to 11 carbon atoms, which comprises heating a mixture of an insoluble and non-volatile acid reacting catalyst and a compound of the formula

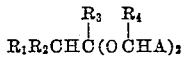

in the liquid phase to a temperature of from 75 to 225° C. while under a pressure of from 0.1 mm. Hg to about 6000 mm. Hg, and causing the de-alcoholation of said compound to form said 1-alkenyl alkenyl ether and an alcohol co-product of the formula

said temperature and pressure being sufficient to vaporize the ether and alcohol co-product, partially rectifying the vapors so produced to separate the compound heated from the ether and alcohol formed from said compound; and recovering said vapors.

13. The method claim 12 wherein A is further defined as 1-alkenyl radical.

References Cited in the file of this patent
UNITED STATES PATENTS

| | | |
|---|---|---|
| 2,482,725 | Bramwyche et al. | Sept. 20, 1949 |
| 2,579,412 | Adelman | Dec. 18, 1951 |
| 2,667,517 | Longley | Jan. 26, 1954 |

OTHER REFERENCES

Claisen: L., Ber. Deut. Chem., 31, 10.20 (1898).
Hurd et al.: Jour. Amer. Chem. Soc., vol. 60 (1938), pages 1905–1911 (7 pages).